United States Patent
Xu et al.

(10) Patent No.: US 9,722,496 B2
(45) Date of Patent: *Aug. 1, 2017

(54) TRANSMISSION VOLTAGE LOSS COMPENSATION CIRCUIT, COMPENSATION METHOD, CONTROLLING CHIP AND SWITCHING POWER SUPPLY

(71) Applicant: Silergy Semiconductor Technology (Hangzhou) LTD, Hangzhou, ZheJiang Province (CN)

(72) Inventors: Xiaoru Xu, Hangzhou (CN); Yunlong Han, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/160,070

(22) Filed: May 20, 2016

(65) Prior Publication Data

US 2016/0268910 A1  Sep. 15, 2016

Related U.S. Application Data

(63) Continuation of application No. 14/246,065, filed on Apr. 5, 2014, now Pat. No. 9,413,252.

(30) Foreign Application Priority Data

Apr. 15, 2013  (CN) .......................... 2013 1 0131758

(51) Int. Cl.
  H02M 3/335  (2006.01)
  H02M 1/08  (2006.01)
  H02M 1/00  (2006.01)

(52) U.S. Cl.
  CPC ......... *H02M 3/33515* (2013.01); *H02M 1/08* (2013.01); *H02M 3/335* (2013.01);
  (Continued)

(58) Field of Classification Search
  CPC ......... H02M 3/33523; H02M 3/33507; H02M 3/335; H02M 2001/0025
  See application file for complete search history.

(56) References Cited

U.S. PATENT DOCUMENTS 6,661,214 B1  12/2003  Hann et al.
7,099,163 B1  8/2006  Ying
(Continued)

FOREIGN PATENT DOCUMENTS

CN  101860243 A  10/2010

*Primary Examiner* — Matthew Nguyen
*Assistant Examiner* — Ishrat Jamali
(74) *Attorney, Agent, or Firm* — Michael C. Stephens, Jr.

(57) ABSTRACT

In one embodiment, a method of compensating for transmission voltage loss from a switching power supply, can include: (i) receiving a sampling signal that represents an output current of the switching power supply; (ii) delaying the sampling signal to generate a delayed sampling signal; (iii) converting the delayed sampling signal to generate a compensation signal; and (iv) regulating an output voltage of the switching power supply based on the compensation signal to compensate for the transmission voltage loss from the output voltage transmission to a load such that a voltage at the load is maintained as substantially consistent with an expected voltage at the load.

20 Claims, 4 Drawing Sheets

(52) U.S. Cl.
CPC ... *H02M 3/33507* (2013.01); *H02M 3/33523* (2013.01); *H02M 2001/0025* (2013.01)

(56) References Cited

U.S. PATENT DOCUMENTS

| | | | |
|---|---|---|---|
| 7,480,159 B2 | 1/2009 | Wei et al. | |
| 8,120,931 B2* | 2/2012 | Chang | H02M 1/32 363/21.07 |
| 8,976,546 B2 | 3/2015 | Wang et al. | |
| 2008/0259655 A1* | 10/2008 | Wei | H02M 3/335 363/21.18 |
| 2013/0148387 A1 | 6/2013 | Ren et al. | |
| 2013/0223108 A1 | 8/2013 | Xu | |
| 2013/0250629 A1 | 9/2013 | Xu | |

\* cited by examiner

TRANSMISSION VOLTAGE LOSS COMPENSATION CIRCUIT, COMPENSATION METHOD, CONTROLLING CHIP AND SWITCHING POWER SUPPLY

RELATED APPLICATIONS

This application is a continuation of the following application, U.S. patent application Ser. No. 14/246,065, filed on Apr. 5, 2014, and which is hereby incorporated by reference as if it is set forth in full in this specification, and which also claims the benefit of Chinese Patent Application No. 201310131758.4, filed on Apr. 15, 2013, which is incorporated herein by reference in its entirety.

FIELD OF THE INVENTION

The present invention relates to the field of power supplies, and more particularly to a transmission voltage loss compensation circuit, compensation method, controlling chip, and an associated switching power supply.

BACKGROUND

A switched-mode power supply (SMPS), or a "switching" power supply, can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a method of compensating for transmission voltage loss from a switching power supply, can include: (i) receiving a sampling signal that represents an output current of the switching power supply; (ii) delaying the sampling signal to generate a delayed sampling signal; (iii) converting the delayed sampling signal to generate a compensation signal; and (iv) regulating an output voltage of the switching power supply based on the compensation signal to compensate for the transmission voltage loss from the output voltage transmission to a load such that a voltage at the load is maintained as substantially consistent with an expected voltage at the load.

In one embodiment, a transmission voltage loss compensation circuit configured for a switching power supply, can include: (i) a delay circuit configured to delay a sampling signal that represents an output current of the switching power supply to generate a delayed sampling signal; (ii) a voltage-current conversion circuit configured to convert the delayed sampling signal to a first current signal, where the first current signal is coupled to a feedback terminal to generate a compensation signal; and (iii) a controlling circuit having the feedback terminal and being configured to regulate an output voltage of the switching power supply based on the compensation signal to compensate for transmission voltage loss from the output voltage transmission to a load such that a voltage at the load is maintained as substantially consistent with an expected voltage at the load.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Along with rapid development in the electronic information industry, switching power supplies are widely used in computers, electrical equipment, instruments and meters, light-emitting diode (LED) lighting, medical equipment, military equipment, and other fields. Switching power supplies are generally employed to convert an external AC source (e.g., 220V, 380V, etc.) to a substantially constant DC source to supply power for loads (e.g., LEDs, other circuitry, etc.).

Figure 1:
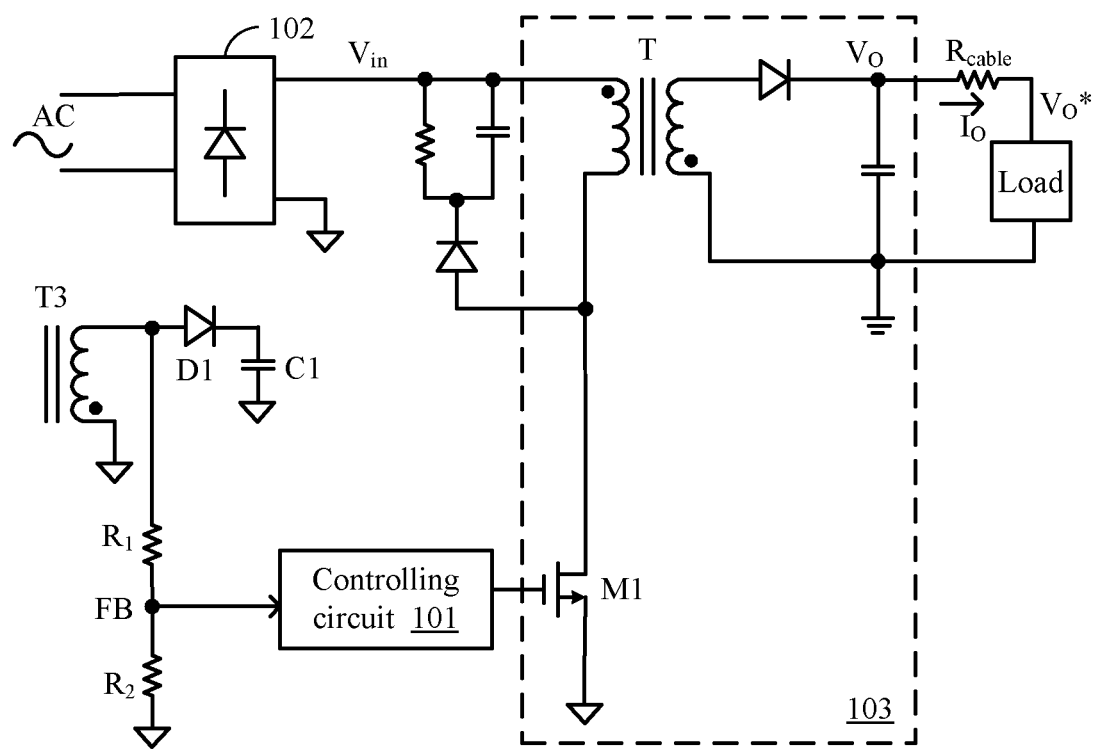
FIG. 1 is a schematic block diagram of an example flyback power supply.

Referring now to FIG. 1, shown is a schematic block diagram of an example flyback power supply. This example switching power supply can include controlling circuit 101, rectifier circuit 102, and power stage 103. For example, controlling circuit 101 can control the on and off states of main switch (e.g., transistor) M1 of power stage 103, in order to maintain substantially constant output voltage $V_O$ at a secondary side of transformer T of power stage 103.

However, due to the transmission wire resistance that comes into play when transferring output voltage $V_O$ to loads (e.g., $R_{cable}$ can represent an equivalent resistor of the transmission wire), voltage $V_O^*$ at the load be $V_O^*=V_O-I_O \times R_{cable}$. Here, $I_O$ can represent the output current of the switching power supply. For example, if output current $I_O$ varies (e.g., increases), the voltage drop on the transmission wire can also increase, and this can cause a failure to maintain the original or expected constant value of voltage $V_O^*$ at the load.

In order to overcome such transmission line losses, a compensation apparatus, such as one or more capacitors configured to regulate the output current in order to decrease the voltage drop on the transmission wire, can be employed. However, the reactive power of capacitors is in direct proportion with the square of the supply voltage, or voltage across such capacitors. Thus, if the supply voltage is lower than a rated value of a particular capacitor, the loss of the capacitor can be increased, thus possibly reducing the lifetime of the capacitor. Further, because the capacitance of the capacitor is fixed, there are some limitations to regulation of the output current in this approach. In addition, overall cost and circuit volume can be increased if a capacitor bank is utilized, also resulting in integration difficulties.

In one embodiment, a transmission voltage loss compensation circuit configured for a switching power supply, can include: (i) a delay circuit configured to delay a sampling signal that represents an output current of the switching power supply to generate a delayed sampling signal; (ii) a voltage-current conversion circuit configured to convert the delayed sampling signal to a first current signal, where the first current signal is coupled to a feedback terminal to generate a compensation signal; and (iii) a controlling circuit having the feedback terminal and being configured to regulate an output voltage of the switching power supply based on the compensation signal to compensate for transmission voltage loss from the output voltage transmission to a load such that a voltage at the load is maintained as substantially consistent with an expected voltage at the load.

Figure 2:
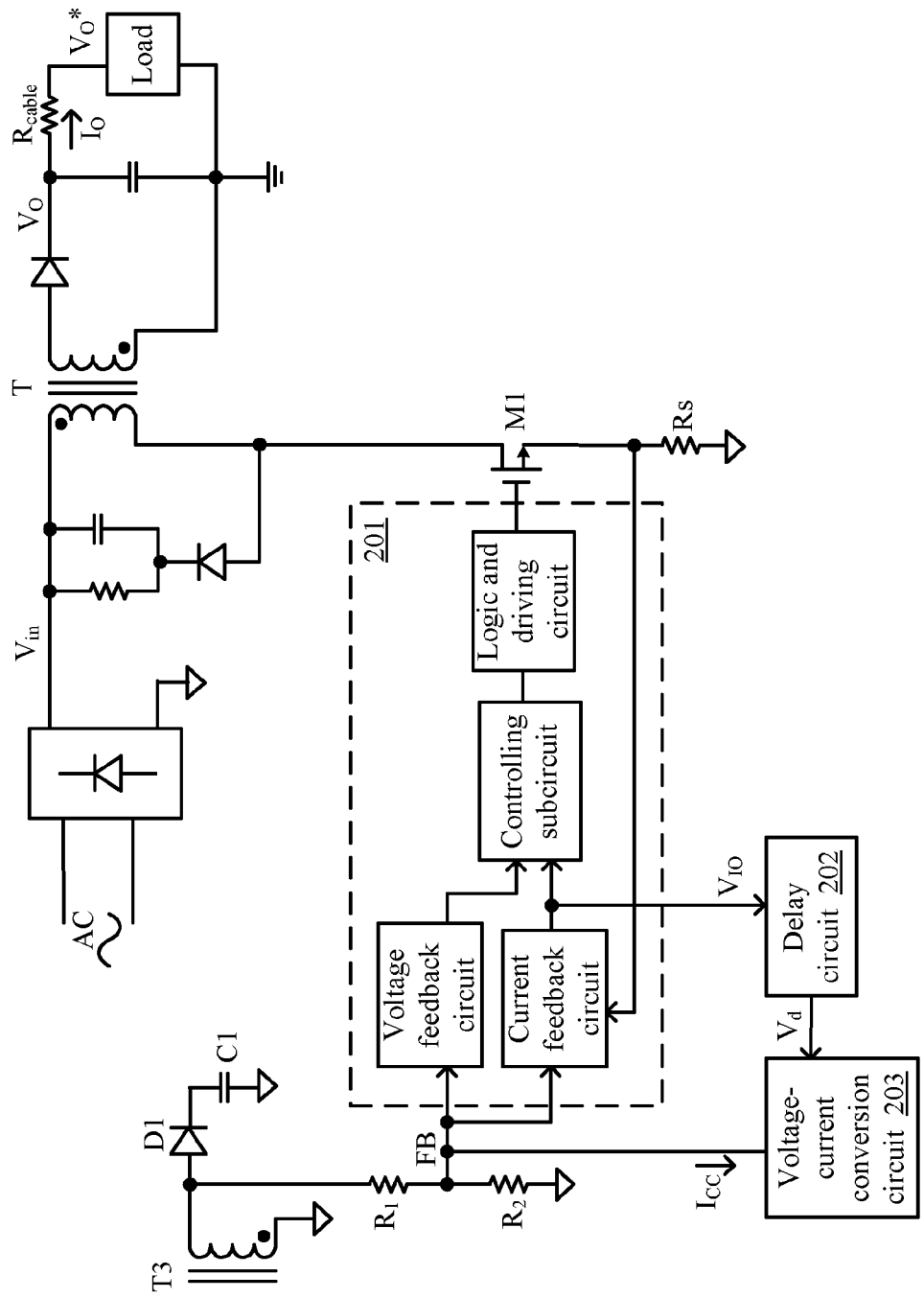
FIG. 2 is a schematic block diagram of an example transmission voltage loss compensation circuit for a switching power supply, in accordance with embodiments of the present invention.

Referring now to FIG. 2, shown is a schematic block diagram of an example transmission voltage loss compensation circuit for a switching power supply, in accordance with embodiments of the present invention. This example switching power supply can include controlling circuit 201 having a constant current and/or constant voltage controlling mode. Controlling circuit 201 can include a voltage feedback circuit, a current feedback circuit, a controlling sub-circuit, and a logic and driving circuit (see, e.g., U.S. Patent Publication No. 2013/0223108 for example implementations of such circuitry).

In particular embodiments, a transmission voltage loss compensation circuit can include delay circuit 202 and voltage-current conversion circuit 203. For example, delay circuit 202 can delay sampling signal $V_{IO}$ that represents an output current of the switching power supply, in order to generate delayed sampling signal $V_d$ which can be provided to voltage-current conversion circuit 203. Also in this example, sampling signal $V_{IO}$ can also be coupled to the current feedback circuit of controlling circuit 201 through sampling resistor Rs in the flyback switching power supply. Sampling signal $V_{IO}$ can be determined as indicated below in formula (1).

$$V_{IO} = I_P \times R_S \times \frac{T_{dis}}{T_s} \quad (1)$$

Here, $I_P$ can represent a peak current of the primary winding of flyback switching power supply, $T_{dis}$ can represent a discharging time of the secondary winding, and $T_S$ can represent the switching cycle. The output current can be indicated as below in formula (2), in accordance with operating principles flyback switching power supplies.

$$I_o = \frac{1}{2} \times I_P \times N \times \frac{T_{dis}}{T_S} \quad (2)$$

If the number of turns of the primary winding of transformer T is $N_1$, and the number of turns of secondary winding is $N_2$, N can represent a ratio of the number of turns of the primary winding to that of the secondary winding of transformer T. Form formula (1) and (2), it can be deduced that sampling signal $V_{IO}$ can represent the output current of the switching power supply. Also, while the above formulas and examples relative to sampling signal $V_{IO}$ can be applied in a flyback type of switching power supply, any suitable converter topology (e.g., flyback, forward, boost, buck, SEPIC, ZETA, etc.) can be employed in particular embodiments.

In certain embodiments, voltage-current conversion circuit 203 can convert delay signal $V_d$ to current signal $I_{CC}$. In addition, voltage-current conversion circuit 203 can be coupled to a feedback terminal (FB) of the output voltage of the switching power supply (e.g., via auxiliary winding T3) at controlling circuit 201, to generate a compensation signal ($V_{comp}$), which can be a voltage across resistor $R_1$ that is based on current signal $I_{CC}$. In particular embodiments, output voltage $V_O$ can be regulated by controlling circuit 201 in accordance with compensation signal $V_{comp}$ to compensate for a voltage loss that occurs due to transmission of the output voltage to the load. In this way, output voltage $V_O^*$ at the load can be maintained as substantially consistent with an expected output voltage.

Figure 3:
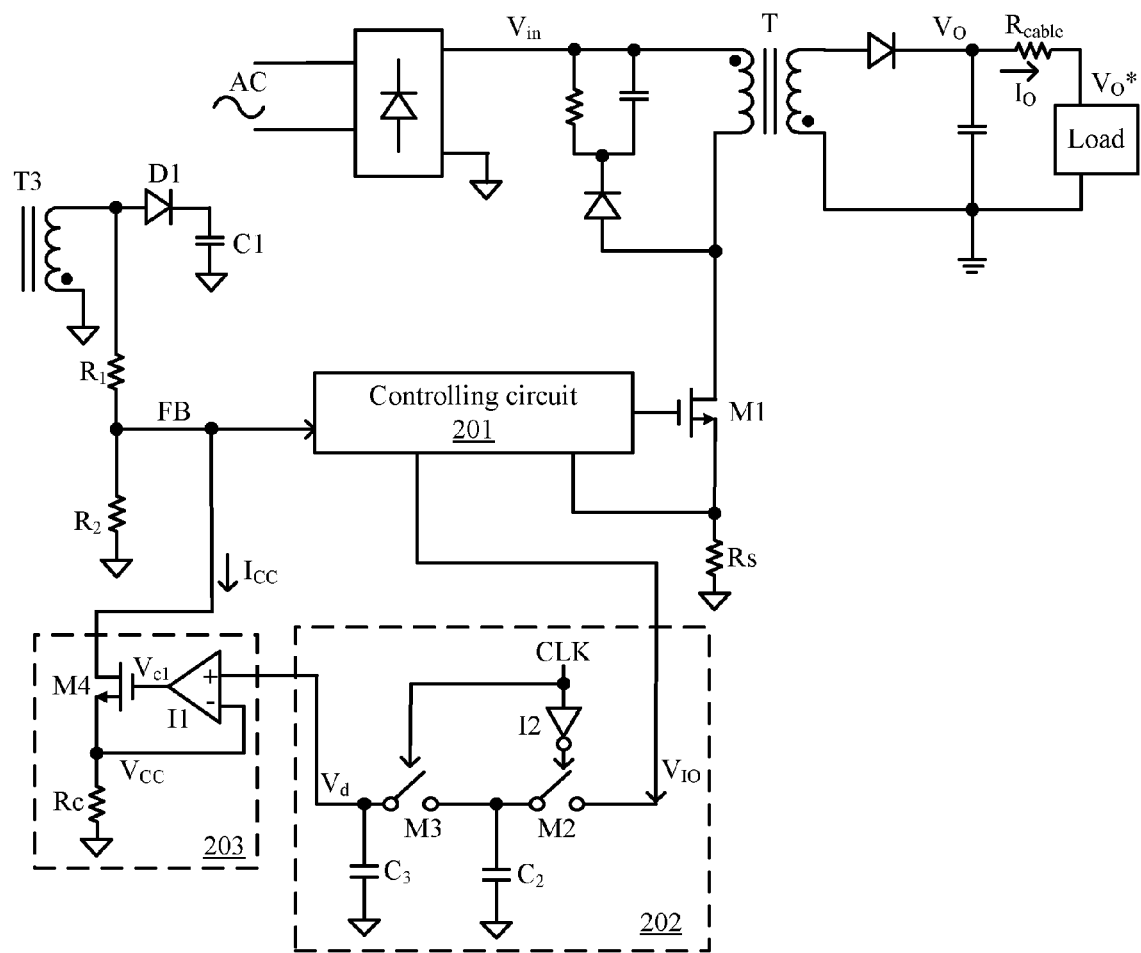
FIG. 3 is a schematic block diagram of example delay and voltage-current converting circuits of the example of FIG. 2.

Referring now to FIG. 3, shown is a schematic block diagram of example delay and voltage-current converting circuits of the example of FIG. 2. In this example, delay circuit 202 can include capacitors $C_2$ and $C_3$, and switches M2 and M3. Switches M2 and M3 can connect series between sampling signal $V_{IO}$ and delayed sampling signal $V_d$ at voltage-current conversion circuit 203. Capacitor $C_2$ can connect to a common node between switches M2 and M3, and ground. Also, capacitor $C_3$ can connect to a common node between switch M3 and delayed sampling signal $V_d$ at voltage-current conversion circuit 203, and to ground. For example, the on and off states of switch M3 can be controlled by clock signal CLK, and the on/off states of switch M2 can be controlled by an inverted version of clock signal CLK.

In operation, the bandwidth of the compensation loop can be controlled to guarantee stability of the transmission voltage loss compensation circuit. The bandwidth can generally decrease (e.g., the time constant of the compensation circuit can be set as 20 ms) to achieve better stability of the compensation loop, and to avoid interference to the bandwidth of the system. Delay circuit 202 can meet the above requirements, and may also significantly decrease overall cost and circuit volume, as compared to conventional approaches. The equivalent time constant $\tau_{eq}$ of delay circuit can be indicated as below in formula (3).

$$\tau_{eq} = C_3 \times R_{eq} \quad (3)$$

$R_{eq}$ can represent an equivalent resistance (e.g., of switches M2 and M3) of delay circuit 202. Formula (4) below can be deduced in accordance with the example circuit configuration.

$$\frac{V_{IO} \times C_2}{C_2 + C_3} = \frac{V_{IO}}{R_{eq}} \times T_{CLK} \times \frac{1}{C_3} \quad (4)$$

Here, $T_{CLK}$ can represent the switching cycle of clock signal CLK. Formula (4) can be converted to obtain formula (5), as shown below.

$$R_{eq} = \frac{T_{CLK} \times (C_2 + C_3)}{C_2 \times C_3} \quad (5)$$

If $C_3$ is far greater than $C_2$, the equivalent resistance $R_{eq}$ can be as shown below in formula (6).

$$R_{eq} \approx \frac{T_{CLK}}{C_2} \qquad (6)$$

Formula (6) can be substituted into formula (3) to obtain formula (7), as shown below.

$$\tau_{eq} = C_3 \times \frac{T_{CLK}}{C_2} \qquad (7)$$

For example, when equivalent time constant $\tau_{eq}$ is set as 20 ms, $T_{CLK}$ can be 1 ms, $C_2$ can be 0.5 pF, and $C_3$ can be 10 pF. Therefore, improved stability of the transmission voltage loss compensation circuit can be achieved, and cost and circuit volume can also be decreased with no additional IC pins, and reduced capacitances of capacitors $C_2$ and $C_3$ can facilitate circuit integration.

In the example of FIG. 3, voltage-current conversion circuit 203 can include comparator I1, switch (e.g., transistor) M4, and resistor Rc. Comparator I1 can compare delayed sampling signal $V_d$ against voltage signal $V_{cc}$, in order to generate comparison signal $V_{c1}$. The controlling terminal of switch M4 can receive comparison signal $V_{c1}$, and a first power terminal (e.g., drain) of transistor M4 can be coupled to feedback terminal FB of the output voltage of the switching power supply. Resistor Rc can be coupled between the second power terminal (e.g., source) of transistor M4 and ground. Also, a voltage at a common node of switch M4 and resistor Rc can be configured as voltage signal $V_{CC}$.

In particular embodiments, when voltage signal $V_{CC}$ is less than sampling signal $V_{IO}$, comparison signal $V_{c1}$ can be high. As a result, switch M4 can be turned on until voltage signal $V_{CC}$ is equal to sampling signal $V_{IO}$, which can turn switch/transistor M4 off. Current signal $I_{CC}$ flowing through resistor Rc can be indicated as per formula (8), as shown below.

$$I_{CC} = \frac{V_{IO}}{R_C} \qquad (8)$$

In normal operation, a voltage at feedback signal FB that represents an output voltage of the switching power supply can be substantially fixed as reference voltage $V_{REF}$, which can be an expected output voltage of the switching power supply. A resistor divider network including resistors $R_1$ and $R_2$ can be employed to obtain a voltage at FB (e.g., a voltage drop across resistor $R_1$) that may represent the present output voltage. Output voltage $V_O$ can be regulated by controlling circuit 201 in accordance with output voltage feedback signal FB if there were no transmission voltage loss compensation circuit (e.g., when transistor M4 is off), which can be indicated as below in formula (9).

$$V_O = V_{REF} \times \frac{R_1 + R_2}{R_2} \times \frac{N_2}{N_3} \qquad (9)$$

Here, $N_2$ and $N_3$ can respectively represent the numbers of turns of the secondary winding and the auxiliary winding.

Because switch M4 is coupled to output voltage feedback signal FB, a voltage drop on resistor $R_1$ of the resistor divider network due to current signal $I_{CC}$ can be configured as compensation signal $V_{comp}$, as indicated below in formula (10).

$$V_{comp} = I_{CC} \times R_1 \qquad (10)$$

In particular embodiments, the output voltage of the switching power supply can be regulated by controlling circuit 201 based on compensation signal $V_{comp}$ and output voltage feedback signal FB. Output voltage $V_O^*$ at the load can accordingly be indicated as below in formula (11).

$$V_O^* = \left[ V_{REF} + \left( \frac{V_{REF}}{R_2} + I_{CC} \right) \times R_2 \right] \times \frac{N_2}{N_3} \qquad (11)$$

Output voltage error can be indicated as below in formula (12) by subtracting formula (9) from formula (11).

$$\Delta V = V_O^* - V_O = I_{CC} \times R_2 \times \frac{N_2}{N_3} \qquad (12)$$

Formula (13) can be obtained by inserting formulas (1), (2), and (8) into formula (12), as shown below.

$$\Delta V = \frac{2 \times R_S \times R_1 \times N_2^2}{R_C \times N_2 \times N_3} \times I_O \qquad (13)$$

The value of voltage loss generated by transmission of the output voltage to the load can be indicated as $I_O \times R_{cable}$, where $R_{cable}$ can represent an equivalent resistance of the transmission wire(s). The resistance of resistor $R_1$ of the resistor divider network can be regulated to make the output voltage error substantially equal to a product of $I_O$ and $R_{cable}$. Therefore, the voltage loss of the transmission wire can be offset by an additional voltage value at the load, in order to maintain the voltage at the load as substantially constant at an expected output voltage level.

In particular embodiments, a compensation signal can be generated in accordance with the output current of the switching power supply. The output voltage of the switching power supply can be regulated in accordance with the compensation signal and output voltage feedback signal. Therefore, the output voltage can be regulated adaptively to match variability of the output current, in order to compensate for voltage loss of the transmission wire(s) from the power supply to the load. In addition, a resistance (e.g., $R_1$) of the resistor divider network in the transmission voltage loss compensation circuit of particular embodiments can be regulated to maintain better adaptability for variable transmission cables, a wider range of application, and improved stability. Further, smaller capacitors and resistors used in this approach can provide advantages of lower cost, lower volume, and better integration performance, as compared to conventional approaches.

In another example, delay circuit 202 can include a resistor and a capacitor coupled in series between the sampling signal $V_{IO}$ and ground. In this case, a common node of this resistor and capacitor can be configured as delayed sampling signal $V_d$. In addition, voltage-current conversion circuit 203 can be implemented via any other suitable circuit configurations, such as other than the exemplified voltage-controlled current source. Further, the power stage of the switching power supply can be implemented in any suitable converter topology (e.g., boost, buck, flyback, etc.).

In one embodiment, a method of compensating for transmission voltage loss from a switching power supply, can include: (i) receiving a sampling signal that represents an output current of the switching power supply; (ii) delaying the sampling signal to generate a delayed sampling signal; (iii) converting the delayed sampling signal to generate a compensation signal; and (iv) regulating an output voltage of the switching power supply based on the compensation signal to compensate for the transmission voltage loss from the output voltage transmission to a load such that a voltage at the load is maintained as substantially consistent with an expected voltage at the load.

Figure 4:
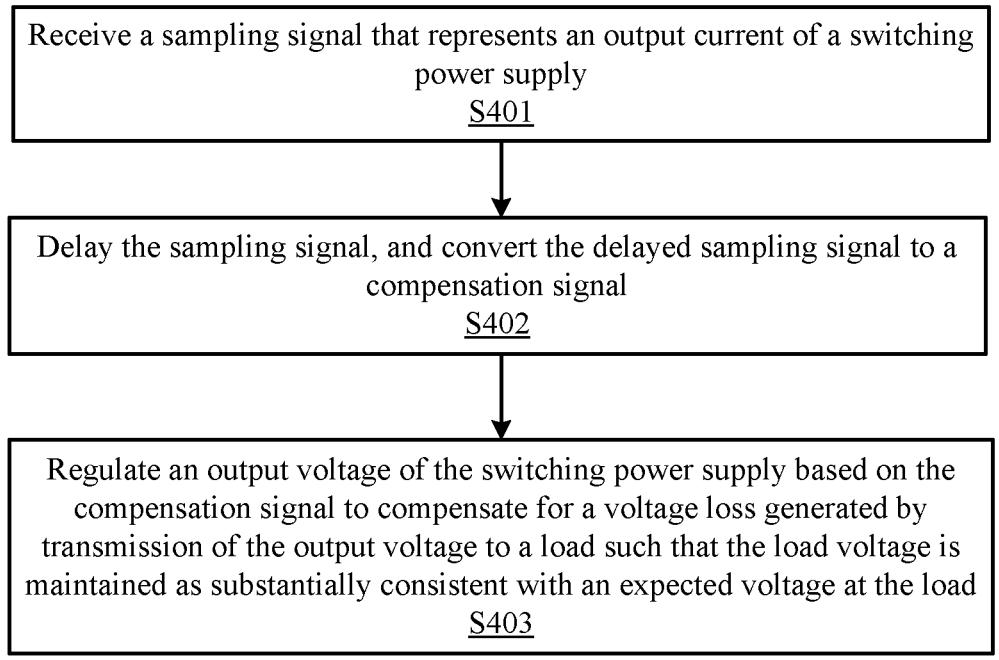
FIG. 4 is a flow diagram of an example method of compensating for voltage transmission loss from a switching power supply, in accordance with embodiments of the present invention.

Referring now to FIG. 4, shown is a flow diagram of an example method of compensating for voltage transmission loss from a switching power supply, in accordance with embodiments of the present invention. At S401, a sampling signal (e.g., $V_{IO}$) that represents an output current of the switching power supply can be received (e.g., in delay circuit 202). At S402, the sampling signal can be delayed, and the delayed sampling signal (e.g., $V_d$) can be converted to a compensation signal (e.g., via voltage-current conversion circuit 203). At S403, the output voltage of the switching power supply can be regulated in accordance with the compensation signal, in order to compensate for a voltage loss that occurs due to output voltage transmission from the switching power supply to the load, in order to maintain the voltage at the load as substantially consistent with an expected output voltage.

Generation of the compensation signal can also include converting the delayed sampling signal to a current signal (e.g., by voltage-current conversion circuit 203), generating an output voltage feedback signal by a resistor divider network (e.g., including resistors $R_1$ and $R_2$), and employing the voltage drop generated on the resistor divider network (e.g., across resistor $R_1$) as the compensation signal.

In addition, a controlling chip or IC can also be provided in particular embodiments, where the controlling chip can include controlling circuit 201 and a transmission voltage loss compensation circuit (e.g., including delay circuit 202 and voltage-current conversion circuit 203). Of course, other combinations of chips on a printed-circuit board (PCB) and/or other levels of integration, can also be supported in particular embodiments.

Particular embodiments can also include a switching power supply, which can include controlling circuit 201, a power stage, and a transmission voltage loss compensation circuit (e.g., including delay circuit 202 and voltage-current conversion circuit 203), as described herein. The power stage circuit can be any appropriate converter topology structure (e.g., flyback, forward, boost, buck, SEPIC, ZETA, etc.). Similarly, the switching power supply, by use of the above-described voltage compensation circuitry, can provide a compensated output voltage in line with an expected output voltage at the load.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A method of compensating for transmission voltage loss from a switching power supply, the method comprising:
    a) receiving, in a current feedback circuit, a feedback signal from a feedback terminal that is coupled to an auxiliary winding of said switching power supply, and a signal from a common node of a sampling resistor and a main switch of said switching power supply;
    b) generating, by said current feedback circuit, a sampling signal that represents an output current of said switching power supply, wherein said sampling signal is generated from said feedback signal and said common node signal;
    d) converting said sampling signal to a compensation signal; and
    e) regulating an output voltage of said switching power supply based on said compensation signal and said feedback signal to compensate for said transmission voltage loss from said output voltage transmission to a load such that a voltage at said load is maintained as substantially consistent with an expected voltage at said load.

2. The method of claim 1, wherein said compensation signal generation comprises:
    a) delaying, by a delay circuit, said sampling signal to generate a delayed sampling signal;
    b) converting said delayed sampling signal to a first current signal by a voltage-current conversion circuit; and
    d) using a voltage drop generated on a resistor divider network as said compensation signal.

3. The method of claim 2, wherein said delay circuit comprises:
    a) first and second switches coupled in series between said sampling signal and said delayed sampling signal, wherein said second switch is controllable by a clock signal, and said first switch is controllable by an inverted version of said clock signal;
    b) a first capacitor coupled between a common node of said first and second switches and ground; and
    c) a second capacitor a coupled between said delayed sampling signal and ground.

4. The method of claim 3, wherein a signal other than said clock signal is connected to a gate of said main switch.

5. The method of claim 3, wherein a capacitance of said second capacitor is far greater than a capacitance of said first capacitor.

6. The method of claim 2, wherein said delay circuit comprises a resistive device and a capacitor coupled in series between said sampling signal and ground, wherein a common node of said resistive device and said capacitor is configured as said delayed sampling signal.

7. A transmission voltage loss compensation circuit configured for a switching power supply, the transmission voltage loss compensation circuit comprising:
    a) a current feedback circuit configured to receive a feedback signal from a feedback terminal coupled to an auxiliary winding of said switching power supply, and a signal from a common node of a sampling resistor and a main switch of said switching power supply, and to generate a sampling signal that represents an output current of said switching power supply therefrom;
    b) a compensation signal generating circuit configured to convert said sampling signal to to a compensation signal; and
    d) a controlling circuit configured to regulate an output voltage of said switching power supply based on said compensation signal and said feedback signal to compensate for transmission voltage loss from said output voltage transmission to a load such that a voltage at said load is maintained as substantially consistent with an expected voltage at said load.

8. A switching power supply, comprising:
a) a power stage circuit; and
b) the transmission voltage loss compensation circuit of claim 7.

9. The switching power supply of claim 8, wherein said power stage circuit is configured as a flyback converter comprising said auxiliary winding and a resistor divider network coupled in parallel, and wherein an output terminal of said resistor divider network is configured as said feedback terminal.

10. The transmission voltage loss compensation circuit of claim 7, wherein said compensation signal generating circuit comprises a delay circuit configured to convert said sampling signal that represents an output current of said switching power supply to generate a delayed sampling signal.

11. The transmission voltage loss compensation circuit of claim 10, wherein said delay circuit comprises:
a) first and second switches coupled in series between said sampling signal and said delayed sampling signal, wherein said second switch is controllable by a clock signal, and said first switch is controllable by an inverted version of said clock signal;
b) a first capacitor coupled between a common node of said first and second switches and ground; and
c) a second capacitor a coupled between said delayed sampling signal and ground.

12. The transmission voltage loss compensation circuit of claim 11, wherein a signal other than said clock signal is connected to a gate of said main switch.

13. The transmission voltage loss compensation circuit of claim 11, wherein an equivalent time constant of said delay circuit is related to a period of said clock signal.

14. The transmission voltage loss compensation circuit of claim 11, wherein a capacitance of said second capacitor is far greater than a capacitance of said first capacitor.

15. The transmission voltage loss compensation circuit of claim 10, wherein said delay circuit comprises a resistive device and a capacitor coupled in series between said sampling signal and ground, wherein a common node of said resistive device and said capacitor is configured as said delayed sampling signal.

16. The transmission voltage loss compensation circuit of claim 10, wherein said compensation signal generating circuit comprises a voltage-current conversion signal configured to convert said delayed sampling signal to a first current signal, wherein said first current signal is coupled to a first terminal to generate a compensation signal.

17. The transmission voltage loss compensation circuit of claim 16, wherein said voltage-current conversion circuit comprises:
a) a first comparator configured to compare said delay signal against a first voltage signal, and to generate a first comparison signal; and
b) a third switch being controllable by said first comparison signal, and having a first power terminal coupled to said feedback terminal, and a second power terminal coupled to ground through a resistor, wherein a voltage at a common node of said third switch and said resistor is configured as said first voltage signal.

18. The transmission voltage loss compensation circuit of claim 10, wherein a time constant of said delay circuit is determined to decrease a bandwidth of said transmission voltage loss compensation circuit.

19. The transmission voltage loss compensation circuit of claim 7, wherein said controlling circuit further comprises a voltage feedback circuit coupled to said feedback terminal.

20. The transmission voltage loss compensation circuit of claim 7, further comprising a resistor divider network coupled in parallel with said auxiliary winding, wherein said resistor divider network comprises first and second resistors coupled in series between a first terminal of said auxiliary winding and ground, wherein a common node between said first and second resistors is configured as said feedback terminal, and wherein a resistance of said first resistor is predetermined in accordance with said transmission voltage loss.

* * * * *